US008793502B2

(12) United States Patent
Carrel et al.

(10) Patent No.: US 8,793,502 B2
(45) Date of Patent: Jul. 29, 2014

(54) METHOD FOR EVALUATING USER'S RIGHTS STORED IN A SECURITY MODULE

(75) Inventors: Xavier Carrel, Le Mont-sur-Lausanne (CH); Sebastien Erard, Lausanne (CH); Christian Wirz, Lausanne (CH); Jimmy Cochard, Attalens (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 649 days.

(21) Appl. No.: 12/741,784

(22) PCT Filed: Nov. 25, 2008

(86) PCT No.: PCT/EP2008/066132
§ 371 (c)(1),
(2), (4) Date: May 6, 2010

(87) PCT Pub. No.: WO2009/068519
PCT Pub. Date: Jun. 4, 2009

(65) Prior Publication Data
US 2010/0268964 A1     Oct. 21, 2010

(30) Foreign Application Priority Data
Nov. 26, 2007   (EP) .................................... 07121526

(51) Int. Cl.
*G06F 21/72*     (2013.01)
(52) U.S. Cl.
USPC .......................................... 713/189; 380/201
(58) Field of Classification Search
USPC ........................... 380/201; 703/182, 189, 192
See application file for complete search history.

(56) References Cited

U.S. PATENT DOCUMENTS

2004/0162846 A1*   8/2004   Nakahara et al. ............. 707/102
2005/0201559 A1    9/2005   Van Der Heijden
(Continued)

FOREIGN PATENT DOCUMENTS

| WO | WO 03/098919   | 11/2003 |
| WO | WO 2005/119583 | 12/2005 |
| WO | WO 2006/044547 | 4/2006  |

OTHER PUBLICATIONS

Jiang et al. Key Distribution Based on Hierarchical Access Control for Conditional Access System in DTV Broadcast, IEEE Transactions on Consumer Electronics, 226 vol. 50, No. 1, February 2004.*
International Search Report issued in PCT/EP2008/066132, mailed Dec. 23, 2008.

(Continued)

*Primary Examiner* — Saleh Najjar
*Assistant Examiner* — Shu Chun Gao
(74) *Attorney, Agent, or Firm* — DLA Piper LLP US

(57) ABSTRACT

The aim of the present invention consists of reducing the switching time from one reception channel to another. In fact, this reduction will be particularly discernable since the number of different rights stored in a security module of a multimedia unit or decoder is high. When a user selects a service among those proposed by an electronic programs guide, an access control module explores a stored service information table in order to extract an access condition associated to the service. This access condition allows determining an index in a rights table stored in the access control module of a right that fulfills the access condition. The access control module transmits to the security module the index thus determined alone or accompanied by a control message. This index allows the security module to find quickly the right that it compares afterwards with the access condition included in the control message after decryption of the latter.

18 Claims, 2 Drawing Sheets

(56) References Cited

U.S. PATENT DOCUMENTS

2006/0031873 A1* 2/2006 Fahrny et al. .................... 725/31
2006/0080526 A1* 4/2006 Kasahara et al. .............. 713/155
2006/0274898 A1* 12/2006 Pedlow, Jr. .................... 380/277

OTHER PUBLICATIONS

Written Opinion issued in PCT/EP2008/066132, mailed Dec. 23, 2008.
"Functional Model of a Conditional Access System", EBU Technical Review, pp. 64-77 (1995).

* cited by examiner

Td →

| In | CA | S | D |
|---|---|---|---|
| 1 | 0010 | TSR1, TSR2, TF1, FR2, FR3 | D1 |
| 2 | 0011 | TSR1, TSR2 | D2 |
| 3 | 0012 | TF1, FR2, FR3 | D3 |
| 4 | 0013 | C+ | D4 |
| 5 | 0014 | C+, TF1 | D5 |
| …… | …… | …… | |

Fig.3

METHOD FOR EVALUATING USER'S RIGHTS STORED IN A SECURITY MODULE

FIELD OF THE INVENTION

The present invention relates to the field of processing access rights to streams transporting encrypted data of various broadcast services such as Pay-TV.

TECHNICAL BACKGROUND

A plurality of multimedia units connected to a management center receive and process broadcast data streams according to access rights stored in one or more security modules associated to these units. The latter comprise personal computers, decoders or mobile equipments.

A security module is a well-known tamper-proof device containing different encryption/decryption keys, information for identifying a user on a network and data defining rights acquired by the user for receiving a content of broadcast services. The security module can have different forms such as a removable smart card inserted in a reader, an integrated circuit welded on a mother board, a card of a SIM (Subscriber Identity Module) type present in the most of mobile equipments.

A multimedia unit includes a hardware and software central module of access control called CAK (Control Access Kernel) linked to the security module, to a module for demultiplexing the stream, to a decryption module, to applications such as an electronic program guide (EPG) and to a return channel towards a management center. The module CAK is in charge of, among other functions, forwarding, towards the security module, the control messages ECM and the management messages EMM extracted from the demultiplexed stream of digital data. The security module processes, verifies and decrypts the control messages ECM according to the rights stored and updated by the management messages EMM. The control words, extracted from the control messages ECM after their positive verification, are then transmitted to the decryption module in order to generate data in clear ready to be exploited by the user.

The streams received by the multimedia units transport a more and more important number of multiplexed channels, corresponding for example, to television programs and to different information services. The user selects these different channels by means of a program guide displayed on a screen in order to view them in live or in differed mode by recording them in a memory associated to the multimedia unit. This large number of programs and their operating possibilities (copies, temporary recording, and transfer to other units) also involve the storage of many rights in the security module. When the user selects a channel and then passes rapidly to one or several other channels, the processing time of data by the security module and the access control module CAK of the multimedia unit increases in line with the diversity of the access rights. In fact, after each selection of a channel the access conditions specific to each program or kind of program are compared with rights stored in the security module and when they become numerous, their processing can take several hundreds of milliseconds. This relatively long processing time can cause undesirable interruption of picture or sound during a fast passing from one channel to another, more commonly called zapping.

During the reception of television programs, the switching time between channels is due essentially to the acquisition of digital data comprising data necessary for decrypting and processing data of the new selected channel. Audio/video data are generally broadcast in a compressed form as MPEG format (Moving Pictures Expert Group). This format is divided according to a layer hierarchy in order to make easier error management, random search, editing, and synchronization with other signals, like the audio stream. The first layer called the video sequence layer comprises information like the size of the picture frame, the sampling rate (bit rate) and the picture rate (frame rate). The second layer is the group of picture layers comprising one or more groups of picture frames including:

picture frames of the I-frame type containing data for constructing a complete picture using compression very similar to JPEG (Joint Photographic Experts Group) compression.

frames of the P-frame type representing the differences with respect to a previous picture and frames of the B-frame type representing the predicted picture according to the previous picture and the next picture.

The third layer or picture layer comprises the frame and frame size information. A video sequence of a group of picture layers is made from the I-frame frame received more recently and from subsequent P and B frames. The I-frame of the beginning of the sequence is the most critical since, when the user changes the channel after having transmitted an I-frame, he must wait for the next I-frame transmission in order to decode the next P and B frames. The I-frames are generally transmitted at a frequency lower or equal to two per second. In the majority of applications the sequence is also protected by the encryption of the binary stream during the transmission. For decryption, the control words of the ECM messages of the conditional access system are also necessary for decrypting the I, P and B frames. The time taken by these decryption operations is added to the channel switching time especially when control messages ECM are transmitted at low data throughput.

The document WO2006044547 discloses a method for increasing the channels switching speed based on storage of channels information according to predetermined channels selection rules. In an example of implementation, the channels information comprises at least an I type frame, a control message ECM and a control word. A module for managing the control words receives ECM messages from several channels and selects the control word to be memorized according to rules stored in an appropriated module. Similar rules of input selection determine the channels from which the I-frames must be stored. For example the decoder firstly processes the most frequently viewed channels, the favorite channels determined by the user or the most important ones determined by an operator, the channel or channels adjacent to the current viewed channel. These lists of priority channels can also be updated dynamically during a change of channel by the user and periodically during a change of ECM messages.

The document WO03098919A1 describes a method based on the prediction of channels that a user could select as for example channels consecutive to the current channel. For the predicted channels, the demultiplexer provides the control word stream and the last decrypted control word is stored. During selection of the predicted channel, the control word can be immediately made available to the decryption module in order to allow the user to have quick access to the content of the channel.

SUMMARY OF THE INVENTION

The aim of the present invention consists of reducing the switching time from one reception channel to another. In fact, this reduction will be particularly discernable since the number of different rights stored in the security module of a multimedia unit or decoder is high.

This aim is reached by a method for evaluating user's rights stored in a security module associated to a multimedia unit comprising a receiver of broadcast encrypted digital data of services and a central access control module having a memory able to store a replication of the user's rights table of the security module to which it is linked and a services information table comprising service descriptors including conditions for accessing to said services, said access control module receiving on one hand at least one encrypted control message, intended to the security module, containing at least one access condition to a service and at least one control word and on the other hand one descriptor of a selected service, the method is characterized in that it comprises the steps of:

exploring, by the access control module, the service information table and extracting from the descriptor at least one access condition to the selected service, searching in the rights table an index corresponding to the right associated to the selected service, when the searching gives a positive result, transmitting the index of the right to the security module, decrypting, by the security module, the control message and extracting the access condition included in the message, verifying the rights present in the security module by starting the verification in the rights table of said security module by the right designated by the index.

When the user selects a service among those proposed by the electronic programs guide, the access control module explores the stored service information table in order to extract the access condition associated to the service. This access condition allows determining the index in the rights table stored in the access control module of a right that fulfils the access condition. The access control module transmits to the security module the index thus determined alone or accompanied by the control message. This index allows the security module to find quickly the right that it compares afterwards with the access condition included in the control message after decryption of the latter.

The advantage of the method is to ensure a fast determination of the right to access the broadcasted data thanks to the previous index searching carried out by the access control module on the base of the descriptor of the selected service.

In case of a negative result during the right index searching in the table of the access control module, no index is transmitted to the security module. The latter decrypts the control message and extracts the access condition in order to compare it with the rights in the table of the security module.

According to the configuration of the set of rights stored in this table, the security module decides to authorize or reject the decryption of the content. This process is of course longer because the tasks of searching and determining the rights are carried out by the security module without previous help from the access control module. The latter comprises in fact a faster processor and calculation software than the ones of the security module.

BRIEF DESCRIPTION OF THE DRAWINGS

The invention will be better understood with the following detailed description, which refers to the attached figures given as non-limitative examples.

FIG. 3 shows an embodiment of the rights table wherein a list of services and a description of a right corresponds to each access condition.

DETAILED DESCRIPTION OF THE INVENTION

Figure 1:
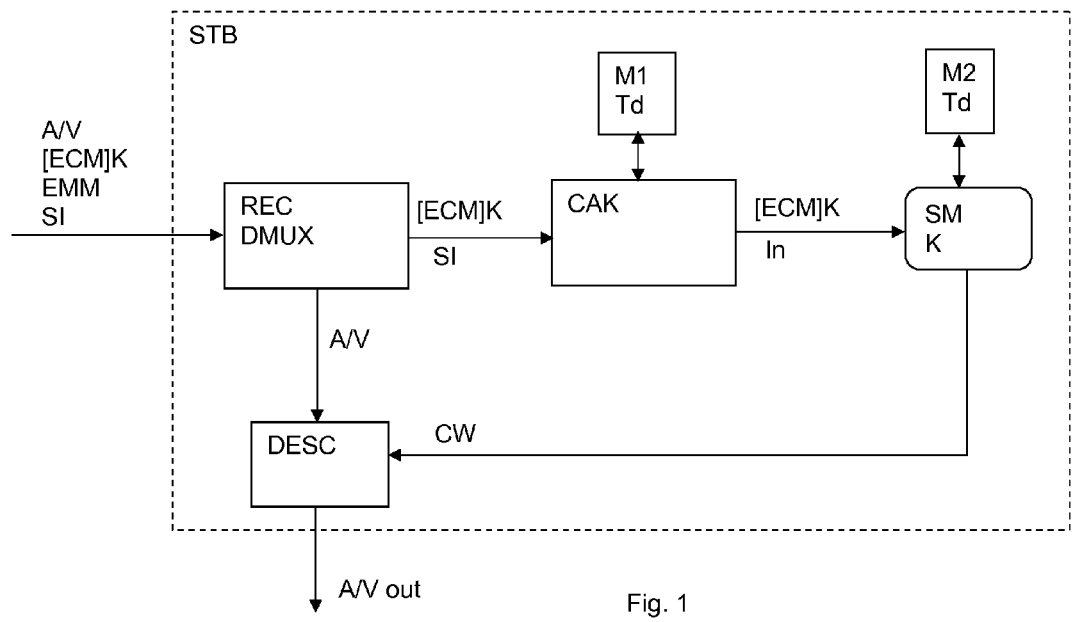
FIG. 1 shows a simplified block-diagram of a multimedia unit showing the different modules intervening in the method for evaluating user rights according to the invention.

A multimedia unit (STB) as represented schematically by FIG. 1 includes a receiver demultiplexer module (REC, DMUX) in charge to filter the different received encrypted digital data streams containing essentially data of audio/video services A/V, control messages ECM, management messages EMM and service information SI. The control messages ECM are encrypted with a key K known by the security module SM, and contain at least one control word CW used as a decryption key of the audio/video services A/V data and at least one access condition CA. These control messages ECM are forwarded towards the access control module CAK and then towards the security module SM for processing.

The control words CW are extracted from the control message ECM and decrypted by the security module SM only when the access conditions CA contained in the message ECM correspond to the rights stored in the security module SM. They are then forwarded to the decryption module DESC receiving the content data of audio/video services A/V from the receiver demultiplexer module (REC, DMUX). The decryption module DESC decrypts these data A/V in order to provide them in clear to the output of the multimedia unit.

The management messages EMM, also extracted from the input stream, are forwarded towards the security module SM allowing renewal and/or updating of the rights, which are stored therein.

The service information SI extracted from the input stream is processed by the access control module CAK in order to create an electronic programs guide allowing the user to select some broadcast services and to access data describing these services. These data comprise information such as the broadcasting timetable, the type of service, the cost for an impulse purchase (IPPV) of a television program, the rights to access the service, etc. The electronic program guide uses the rights information stored in the memory M1 of the access control module CAK.

Figure 2:
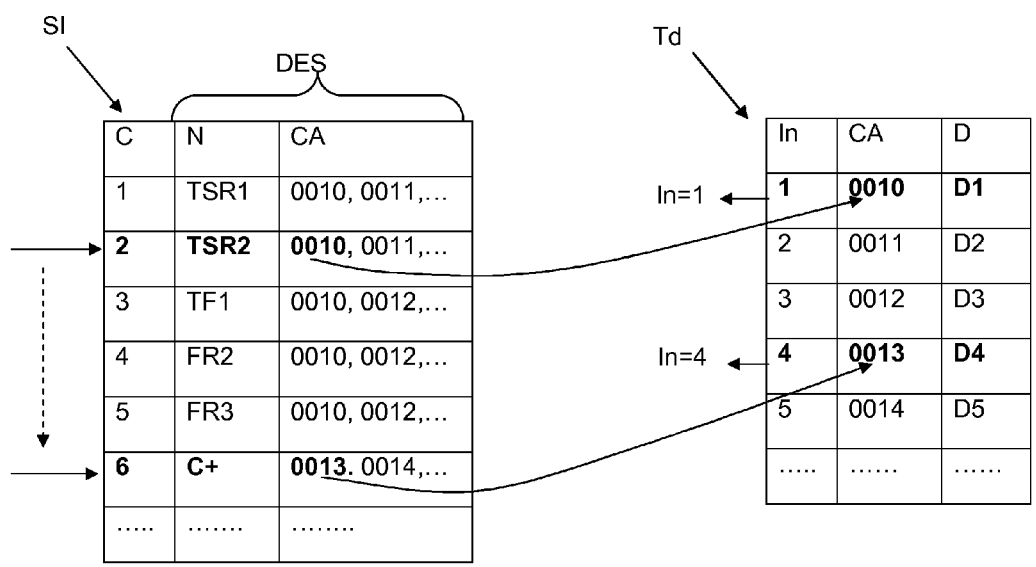
FIG. 2 shows the extraction mechanism of the access conditions associated to channels selected from the service information table and the searching of the index corresponding to these access conditions in the rights table.

It should be noted that the memory M1 of the access control module CAK stores a copy of the rights table Td contained in a memory M2 of the security module. The right table Td of which an example is shown in FIG. 2 comprises lines numbered by an index In corresponding each to a right and columns containing the access conditions CA and the descriptions D1, D2, D3, . . . of rights D from each line. These descriptions D1, D2, D3, . . . comprise a service or program identifier, temporal data of validity of the access to the service or to the program such as dates for the beginning of validity and the expiry of the access, access rules such as a number of authorized access, content recording possibilities, etc.

FIG. 2 shows the mechanism for searching an index corresponding to an access right to a television channel executed by a decoder or more precisely by the software installed in the access control module CAK.

The user selects for example the channel 2 by means of a program guide displayed on a screen resulting from the services information table SI provided by the received data stream and then stored in a memory of the access control module CAK. The information table SI associates each channel number C with a descriptor containing information such as the name N of the channel, the characteristics of broadcast programs in this channel as well as the access conditions CA to this channel. In the example of FIG. 2, when the user selects the channel 2, the access control module CAK explores the services information table SI in order to determine an access condition CA for this channel and extracts for example the access condition CA defined by a code 0010. This code 0010 is then used to search a right in the rights table Td, and in case of success, the access control module CAK transmits an index In=1 to the security module SM. The latter, having the same rights table Td in the memory M2, initiates the control of rights by comparing the code 0010 designated by the index In =1 with the code of the access condition contained in the ECM control message that it has previously received and decrypted with the key K. When the comparison gives a positive result, i.e. when the codes of the access conditions CA are equivalent, the security module can authorize the decryption of the data of the selected program with the control word CW also extracted from the ECM control message.

Usually, the release of the control word CW results from a more advanced verification of the rights than the simple verification of equivalence between a code of an access condition CA from a control message ECM and the code designated by the index In in the rights table Td. In fact, the security module SM additionally verifies the signature of all the rights included in the control messages ECM. This signature is decrypted with a key of the security module for obtaining a digest, and then the digest is compared with a digest calculated by the security module with the rights included in the control message ECM. When these two digests are equivalent, the security module considers that the rights of the ECM messages are authentic. The verification also concerns parameters associated to the rights contained in the rights tables Td such as the temporal data of rights validity in respect to the current date and hour, the numbers and access types previously carried out, etc. When all these verifications produce positive results, the security module SM authorizes the decryption of the data of the selected program.

It should be noted that the descriptor DES of a channel can contain several access conditions CA corresponding each one, for example, to a given subscription type (monthly, annual, limited to certain programs etc.). The control message ECM transmitted in the selected channel further contains one or more access conditions necessary to access the program.

When the user passes from channel 2 to channel 6, the access control module CAK provides the index In=4 to the security module because the access conditions CA to the channel 6 are not the same than those of channel 2. In fact, the code 0013 from services information table SI gives the index In=4 in the rights table Td.

According to an embodiment, shown by FIG. 3, the rights table Td is completed by a list S of services or programs authorized by the access conditions CA. To each list S of services corresponds a description of a right D defining, for example, a period of access to the service or the program, an number of authorized access, the possibilities of recording and/or of copying the content, etc. The access conditions CA contained in the control message ECM allow determining an index In corresponding to a list of services or programs for which a right D is attributed to and defined by a description D1, D2, D3, . . . .

According to an embodiment, the access control module CAK transmits to the security module the received control message ECM of the selected channel accompanied with the index In allowing determining the access right in the rights table Td of the security module SM.

According to a further embodiment, the access control module CAK stores the results of the index In searches in a memory in the form of a transactions table indicating a search number, the channel number and the index found during this search. Thus, during a channel change, the access control module CAK firstly consults this transactions table in order to determine directly the index In of the right D to access the new channel. If the index In is not in the transactions table, the access control module CAK explores the services information table SI in order to determine the access condition CA code allowing searching the corresponding Index In on the rights table Td.

This embodiment allows saving the time for extracting the access conditions CA code from the services information table SI and for searching the corresponding index In in the rights table Td.

During frequent commutations (zapping) of channels often previously selected, this embodiment allows reducing at maximum the access rights evaluation time, which is the aim intended by the present invention.

In this process, the access control module CAK contributes to a fast search of the access right by making available a right index In to the security module SM. This index In allows avoiding a systematic search by the security module SM in the whole rights table Td. However, such search is carried out in the case where the security module SM does not receive any index because of the absence of the right corresponding to the selected channel in the rights table Td. This situation occurs for example when the user of the multimedia unit attempts to select a channel or service for which he does not have sufficient access rights, or when the rights table Td stored in the memory M1 of the access control module CAK is obsolete or invalid.

In such a case, the security module decrypts the control message ECM then compares the access conditions contained in the message with the rights stored in the rights table Td, verifies said rights and decides to authorize the decryption of the control word CW if the configuration of the other stored rights allows it. For example a right to access several channels broadcasting football games can involve a temporary access right to a channel broadcasting rugby games. If the configuration of the other rights is incompatible or because of exclusion due to a parental control for example, the security module SM rejects the authorization for decrypting the control word CW.

According to an option, the security module SM stores the index In of access conditions CA, which have been verified successfully, i.e. those corresponding to the rights whose results of the comparison with the rights of the control messages ECM have been positive. At reception of an index In, the security module SM firstly controls if this index In has already been provided previously by the access control module CAK before accessing the rights table Td stored in the memory M2.

According to another option, when no index is transmitted to the security module by the access control module CAK and when the index In of access conditions CA which have been successfully controlled are stored, the security module can initiate the control of the rights by using a previously stored index. This option also allows the acceleration of the exploration of the rights table by the security module in respect to a systematic exploration of the rights table that would be carried out when no index is transmitted or stored by the security module.

According to an implementation, the operations of exploring the service information table SI, of extracting an access condition CA to the selected service in the service information table SI and of searching in the rights table Td the index In corresponding to the right D associated with the selected service are carried out by a specific rights optimization module connected to the access control module CAK. This rights optimization module driven by the access control module CAK can be implemented in several manners namely:

integrated in the multimedia unit STB on the access control module CAK level which it collaborates with for the quick determination of access rights to the data broadcasted thanks to the previous search of the Index In.

integrated in the security module SM that is generally in the form of a removable smart card inserted in a reader connected to the STB multimedia unit or in the form of a fixed integrated circuit bound to a main board of the multimedia unit STB. The rights optimization module accesses at the same time to the rights table Td stored in the memory M2 of the security module SM and to the electronic programs guide generated by the access control module CAK on the base of the service information table SI.

integrated in an improved security module as described in the European patent EP1766588B1 comprising at least two processors each connected to non-volatile programmable and erasable memories containing data and to random access memories used for the temporary storage of data during processing. In this type of security module, one of the processors is completely insolated with respect to accesses outward the security module thanks to buffer memories. This particular configuration allows increased security and protection for the operations of evaluation, processing and control of the access rights. The rights optimization module is preferably stored on a non-volatile memory connected to the isolated processor accessing a secured memory containing the rights table Td.

The invention claimed is:

1. A method for evaluating a user's rights stored in a security module associated to a multimedia unit, the multimedia unit comprising a receiver configured to receive broadcast encrypted digital data of program services, and a central access control module having a memory, the method comprising steps of:
  receiving by said central access control module at least one encrypted control message containing at least one access condition and at least one control word;
  storing in the memory of the central access control module a copy of a user's rights table stored in the security module;
  storing in the memory of the central access control module a services information table comprising at least one access condition and service descriptors for said program services;
  receiving by the central access control module a selection of a program from a program guide displayed to a user by the multimedia unit, the program guide being based on the services information table;
  determining, by the central access control module, using the services information table at least one access condition associated to the selected program;
  searching, by the access control module, the rights table stored in the memory of the central access control module for a right corresponding to the at least one access condition associated to the selected program;
  when a right corresponding to the at least one access condition is found in the rights table stored in the memory of the central access control module, transmitting by the central access control module to the security module an index of the right corresponding to the at least one access condition, wherein the right defines at least a period of access to services or programs, a number of authorized accesses, possibilities of recording and/or copying content and wherein the access condition determines the index corresponding to a list of services or programs for which a right is attributed to and defined by a description comprising at least a service or program identifier, temporal data of validity of access to the services or programs;
  decrypting, by the security module, the control message and extracting the access condition included in the control message;
  verifying the rights present in the security module by using the index to locate, in the rights table of said security module, the right designated by the index; and
  returning a decrypted control word from the control message to the multimedia unit if the verification is successful.

2. The method according to claim 1 wherein the security module compares the right designated by the index with the access condition contained in the control message previously decrypted and when said access conditions are fulfilled, the security module authorizes the decryption of the data of the selected program with the control word also extracted from the control message.

3. The method according to claim 2, wherein the security module verifies a signature of rights contained in the control message and the parameters associated to the rights contained in the rights table before authorizing the decryption of the data of the selected program with the control word.

4. The method according to claim 1, wherein the security module decrypts the control message, extracts the access condition, compares said access condition with the rights stored in the rights table, verifies said rights and authorizes or rejects the control word decryption according to the configuration of the stored rights, when the search of the index in the rights table gives a negative result.

5. The method according to claim 1, wherein the access control module transmits to the security module the control message accompanied with the index corresponding to the access right to the selected program.

6. The method according to claim 1, wherein the access control module stores in a memory the results of index searches in the form of a transactions table containing at least one identifier of selected programs and the index found during the search.

7. The method according to claim 6, wherein the access control module searches an index in the transactions table before accessing the rights table during a program selection.

8. The method according to claim 1, wherein the security module stores the index of rights whose results of the comparison with the access conditions of the control messages have been positive.

9. The method according to claim 8, wherein the security module verifies the presence of the index previously provided by the access control module before accessing the rights table stored in the memory.

10. A system for controlling access to broadcast data stream including encrypted digital data for a plurality of program services, the system comprising:
  a multimedia unit, the multimedia unit comprising a receiver configured to receive the broadcast data stream, and a central access control module having a memory; and
  a security module configured for communication with the multimedia unit;

wherein the central access control module is configured to
receive at least one encrypted control message containing at least one access condition and at least one control word;
store in the memory a copy of a user's rights table stored in the security module;
store in the memory a services information table comprising at least one access condition and service descriptors for said program services;
receive a selection of a program from a program guide displayed to a user by the multimedia unit, the program guide being based on the services information table;
determine, using the services information table, at least one access condition associated to the selected program;
search the copy of the user's rights table in the memory for a right corresponding to the at least one access condition associated to the selected program, wherein the right defines at least a period of access to services or programs a number of authorized accesses, possibilities of recording and/or copying content and wherein the access condition determines the index corresponding to a list of services or programs for which a right is attributed to and defined by a description comprising at least a service or program identifier, temporal data of validity of access to the services or programs; and
when a right corresponding to the at least one access condition is found in the copy of the user's right table in the memory, transmit to the security module an index to the right in the copy of the user's rights table in the memory corresponding to the at least one access condition; and wherein the security module is configured to
decrypt the control message and extract the access condition included in the control message;
verify the rights present in the security module by using the index to locate, in the user's rights table of said security module, the right designated by the index; and
return a decrypted control word from the control message to the multimedia unit if the verification is successful.

11. The system of claim 10, wherein the security module compares the right designated by the index with the access condition contained in the control message previously decrypted, and when said access conditions are fulfilled, the security module authorizes the decryption of the data of the selected program with the control word also extracted from the control message.

12. The system of claim 11, wherein the security module verifies a signature of rights contained in the control message and the parameters associated to the rights contained in the user's rights table stored in the security module before authorizing the decryption of the data of the selected program with the control word.

13. The system of claim 10, wherein the security module decrypts the control message, extracts the access condition, compares said access condition with the rights stored in the user' rights table stored in the security module, verifies said rights and authorizes or rejects the control word decryption according to the configuration of the stored rights, when the search of the index in the user's rights table stored in the security module gives a negative result.

14. The system of claim 10, wherein the central access control module transmits to the security module the control message accompanied with the index corresponding to the access right to the selected program.

15. The system of claim 10, wherein the central access control module stores in a memory the results of index searches in the form of a transactions table containing at least one identifier of selected programs and the index found during the search.

16. The system of claim 15, wherein the access control module searches an index in the transactions table before accessing the rights table during a program selection.

17. The system of claim 10, wherein the security module stores the index of rights whose results of the comparison with the access conditions of the control messages have been positive.

18. The system of claim 17, wherein the security module verifies the presence of the index previously provided by the access control module before accessing the rights table stored in the memory.

* * * * *